(12) United States Patent
Sako et al.

(10) Patent No.: US 6,345,146 B1
(45) Date of Patent: Feb. 5, 2002

(54) SIGNAL RECORDING/REPRODUCING METHOD AND APPARATUS, SIGNAL RECORD MEDIUM AND SIGNAL TRANSMISSION/RECEPTION METHOD AND APPARATUS

(75) Inventors: Yoichiro Sako, Tokyo; Isao Kawashima, Kanagawa; Yoshitomo Osawa, Kanagawa; Akira Kurihara, Kanagawa; Shozo Masuda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,471

(22) Filed: Oct. 14, 1998

Related U.S. Application Data

(62) Division of application No. 08/698,089, filed on Aug. 15, 1996.

(30) Foreign Application Priority Data

Aug. 25, 1995 (JP) .............................................. 7-217921

(51) Int. Cl.[7] .................................................. H04N 5/91
(52) U.S. Cl. ............................................ 386/94; 386/95
(58) Field of Search .............................. 386/46, 95, 96, 386/111, 112, 83, 94, 125; 348/468, 906; 360/15; 380/203; H04N 5/76, 5/91

(56) References Cited

U.S. PATENT DOCUMENTS

| | | | | |
|---|---|---|---|---|
| 5,134,496 A | * | 7/1992 | Schwab et al. ................ | 386/94 |
| 5,191,436 A | * | 3/1993 | Yonemitsu ................... | 386/112 |
| 5,247,575 A | | 9/1993 | Sprague et al. | |
| 5,400,403 A | | 3/1995 | Fahn et al. | |
| 5,488,409 A | * | 1/1996 | Yuen et al. ................... | 386/95 |
| 5,579,120 A | * | 11/1996 | Oguro ......................... | 386/95 |
| 5,734,787 A | * | 3/1998 | Yonemitsu et al. ........ | 386/111 |
| 5,892,900 A | | 4/1999 | Ginter et al. | |
| 5,907,656 A | * | 5/1999 | Oguro ......................... | 386/94 |

FOREIGN PATENT DOCUMENTS

| | | |
|---|---|---|
| DE | 38 06411 | 9/1989 |
| EP | 0 581 317 | 2/1994 |
| EP | 0 667 720 | 8/1995 |
| EP | 372 601 | 6/1996 |
| EP | 0 762 417 | 3/1997 |
| WO | WO 89/08915 | 9/1989 |
| WO | WO 94/10771 | 5/1994 |
| WO | WO 94 18762 | 8/1994 |

OTHER PUBLICATIONS

Patent Abstracts of Japan 03057382 dated Mar. 12, 1991.
Patent Abstracts of Japan 63269377 dated Nov. 7, 1988.
"Embedding Secret Information Into A Dithered Multi–Level Image" by K. Tanaka, Y. Nakamura and K. Matsui; pp. 0216–0220.
"Embedding Robust Labels Into Images For Copyright Protection" by Jian Zhao & Eckhard Koch; pp. 242–251.

* cited by examiner

*Primary Examiner*—Huy Nguyen
(74) *Attorney, Agent, or Firm*—Frommer Lawrence & Haug LLP; William S. Frommer; Gordon Kessler

(57) ABSTRACT

A signal recording/reproducing method and apparatus, signal record medium and signal transmission/reception method and apparatus, whereby a signal recorded on a signal record medium can identified as being an original signal or a copied signal. A CPU 11 generates, at a pre-set time interval, an identification signal having a meaning at a pre-set time interval, and an identification signal addition circuit 3 adds the identification signal to the video signals and/or the audio signals. A sector forming circuit 5 and circuit components up to a recording/reproducing head 14 record the video signals and/or the audio signals and the ancillary identification signal on an optical disc 12.

20 Claims, 10 Drawing Sheets

SIGNAL RECORDING/REPRODUCING METHOD AND APPARATUS, SIGNAL RECORD MEDIUM AND SIGNAL TRANSMISSION/RECEPTION METHOD AND APPARATUS

CROSS REFERENCE TO RELATED APPLICATIONS

This is a divisional application of co-pending U.S. application Ser. No. 08/698,089 filed Aug. 15, 1996.

BACKGROUND OF THE INVENTION

1. Field of the Invention

This invention relates to a signal recording/reproducing method and apparatus for recording/reproducing signals on or from a signal record (recording, recordable or recorded) medium, a signal record medium having signals recorded thereon, and a signal transmitting/receiving method and apparatus for transmitting/receiving signal over a signal transmission medium.

2. Description of the Related Art

As a signal record medium for recording information signals, such as speech or various sorts of data, such signal record medium for optically recording the information signals, such as a compact disc for music or a CD-ROM employing the CD disc standard for data, is in widespread use. Recently, the standardization for a so-called digital video disc (DVD), as the next generation signal record medium, is also proceeding.

Meanwhile, the entire audio or video signals, for example, recorded on the signal record medium, such as CD, CD-ROM or DAD, may be read out by a reproducing apparatus and duplicated on another signal record medium capable of signal recording and reproduction, such as a hard disc, and the data thus copied on the hard disc may then be supplied to an encoder system for the CD, CD-ROM or DAD for formulating a new CD, CD-ROM or DAD, in order to prepare a CD, CD-ROM or a DAD having recorded thereon the same signals as those recorded on the original signal record medium.

If new signal recording media are produced in this manner one after another, it becomes impossible to discriminate whether the signals recorded on the signal record medium are original signals or copied signals. Of course, this problem is encountered not only in the disc-shaped record medium, such as the CD or CD-ROM, but also in a tape-shaped record medium or other signal recording media. It is therefore desirable that signals recorded on a given signal record medium can be identified to be original signals or copied signals. Although it has been practiced up to now to record in a pre-set area of the signal record medium the information specifying that original signals or copied signals have been recorded on the signal record medium, there lacks up to now a technique for identifying whether the signal is the original signal or the copied signal based on the signal itself.

SUMMARY OF THE INVENTION

It is therefore an object of the present invention to provide a signal record (recording, recordable or recorded) method and apparatus whereby the signals to be recorded on a signal record medium can be identified to be original signals or copied signals.

It is another object of the present invention to provide a signal reproducing method and apparatus whereby the signals already recorded on a signal record medium can be identified to be original signals or copied signals.

It is yet another object of the present invention to provide a signal transmitting method and apparatus whereby it is possible to identify the transmission hysteresis of transmitted signals.

With the signal recording method and apparatus and the signal transmission method and apparatus of the present invention, an identification signal relevant to the video signals and/or the audio signals is inserted as a portion of the video signals and/or the audio signals in a configuration of reducing the effect on the video signals and/or the audio signals, and the video signals is and/or the audio signals, into which has been inserted the identification signal, are recorded on a signal record medium or transmitted over a signal transmission medium.

With the signal reproducing method and apparatus and the signal receiving method and apparatus of the present invention, the video signals and/or the audio signals reproduced from the signal record medium or transmitted over the signal transmission medium are received, and the identification signal, inserted as a portion of the video signals and/or the audio signals, is detected from the reproduced or received signals.

The signal record medium of the present invention has recorded thereon signals comprised of the video signals and/or the audio signals and an identification signal which is relevant to the video signals and/or the audio signals and which has been inserted as a portion of the video signals and/or the audio signals in a configuration of reducing the effect on the video signals and/or the audio signals.

According to the present invention, the meaningful identification signal is added to the video signals and/or the audio signals themselves in order to permit identification of these signals.

That is, according to the present invention, the identification signal relevant to the video signals and/or the audio signals is inserted as a portion of the video signals and/or the audio signals in a configuration of reducing the effect on the video signals and/or the audio signals and the video signals and/or the audio signals, to which has been inserted the identification signal as an ancillary signal, are recorded on a signal record medium or transmitted over a transmission medium. Thus, with the aid of the identification signal, it becomes possible to identify whether the signal recorded on a signal record medium is an original signal or a copied signal, while it also becomes possible to comprehend the hysteresis of the received signal. In addition, the identification signal, thus added to the video signals and/or the audio signals, is effective to prevent unauthorized copying.

DESCRIPTION OF THE PREFERRED EMBODIMENTS

Figure 1:
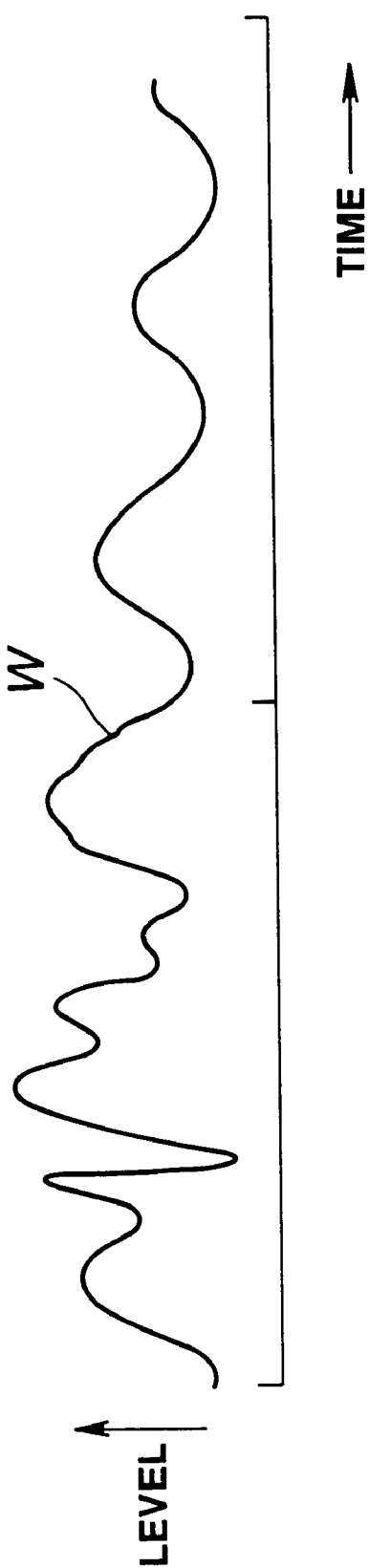
FIG. 1 illustrates a typical waveform of audio signals.

Referring to the drawings, preferred embodiments of the present invention will be explained in detail.

According to the present invention, an identification signal pertinent to the video signal and/or the audio signal is inserted as a part of the video signal and/or the audio signal in a configuration of reducing the effect on the video signal and/or the audio signal.

An illustrative example of insertion of such identification signal is hereinafter explained.

If time-domain data, such as music signals, are digitized, "0"s and "1"s are randomly distributed in the least significant bits (LSBs) in such digital data. If only these LSBs are collected, the distribution of "0"s and "1"s are generally the normal distribution about 50% as center.

Figure 2:
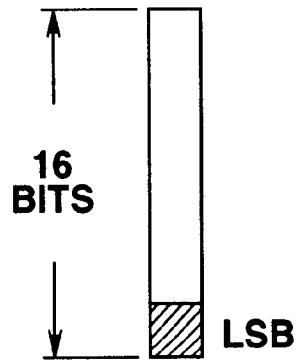
FIG. 2 illustrates an embodiment in which an identification signal is appended to the least significant bit (LSB) of a 1-sample-16-bit time domain audio PCM signals.
Figure 3:
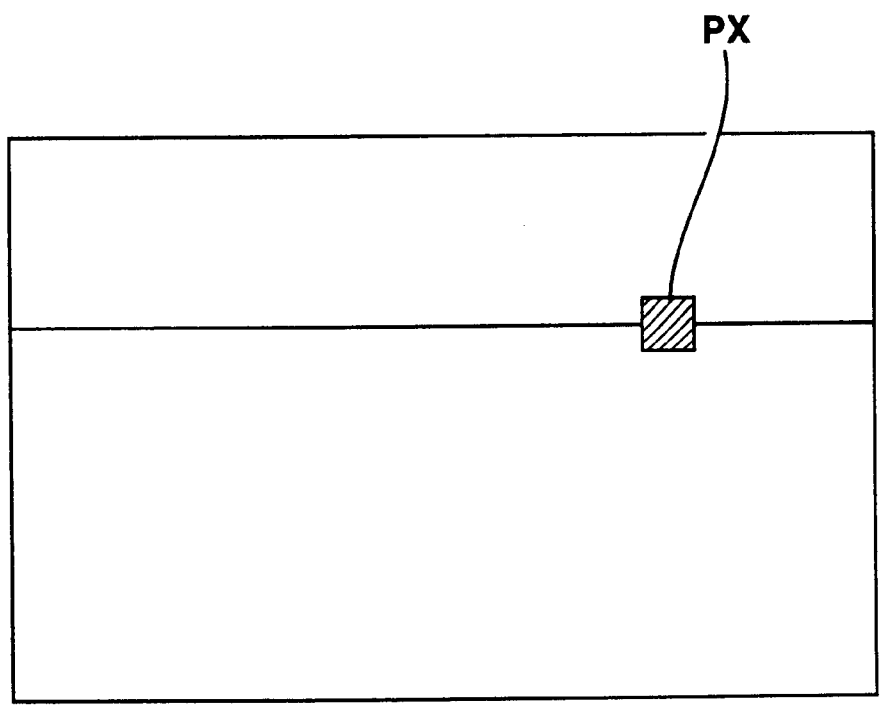
FIG. 3 shows an arbitrary pixel in a frame to which is appended an identification signal.

For example, if the audio signal waveform W as shown in FIG. 1 is sampled and quantized to 1-sample-16-bit time domain audio PCM signals shown for example in FIG. 2, the least significant bits (LSBs) of the 1-sample-16-bit time domain audio PCM signals are handled statistically.

If 1,000 samples are handled as a statistic, the distribution of "0" and "1" deviates from a range of ¤62 about 500 as a center (438 or less and 562 or more) in a state in which the level of significance is 0.01% and there is a bias which is not a usual state.

Therefore, the state biased to "1" or "0" may be created by compulsorily increasing "1" or "0" in the LSBs of the sample data of the original signals for detection.

If, for a pre-set time width, or a certain time interval, the LSBs of the audio PCM signals of the respective samples are set for example to "0", irrespective of whether the time interval is synchronous or non-synchronous, the number of "0"s is statistically increased, with the number of "1"s being decreased. Conversely, if the LSBs are set to "1", the number of "1"s is statistically increased, with the number of "0"s being decreased. Thus it becomes possible to represent one bit of the pertinent identification signal.

Most simply, the LSBs of the continuous 1,000 samples may compulsorily be set to "1" or "0". Although this simplifies detection, the LSBs of 16-bit samples are used contiguously, the effective bits become 15 bits, thus deteriorating the signal. In addition, the signal tends to be altered.

Thus it may be contemplated to set arbitrary 200 of 1000 consecutive samples compulsorily to "1" or "0". These arbitrary 200 samples may be consecutive in an arbitrary position in the 1,000 samples, or may be at discontinuous random positions. If the samples are contiguous, they can be detected easily. However, the risk of signal deterioration and alteration becomes higher.

If the arbitrary 200 samples in the contiguous 1,000 samples are set compulsorily to "1" or "0", the LSBs of the remaining 800 samples may be approximated to the normal distribution. For example, if "1"s are introduced into the 200 samples, the number of "1"s in the LSBs of the remaining 800 samples, if fluctuated, is comprised substantially in 400 ¤40. If 200 "1"s are added, the number of "1" s of the LSBs of the 1,000 samples is 600¤40, with the level of significance being 0.01%. It may thus be seen that 1 bit of the identification signal is "1". Similarly, by inserting "0" into the LSBs of the 200 samples, the 1 bit of the identification signal may be associated with "0". By compulsorily setting the LSBs of the arbitrary 200 samples to "1" or "0" every 1,000 samples of the audio PCM signals as main data, "1"s or "0"s of the identification signals can be sequentially embedded in the main data itself.

As more specified examples, the LSBs of the 200 samples are compulsorily set to "1"s or "0"s at an interval of 5 samples of the 1,000 samples. In this case, since the original signals are not changed continuously, the effect is small as compared to the case of embedding in LSBs of contiguous 200 samples. For detection, the number of "1"s or "0"s of the LSBs of the 1,000 samples may be counted. Alternatively, the 5-sample period count may be performed in parallel for five series of different phases to find out a series where drastic bias exists.

If the periodic position samples in the series of samples are used, the LSBs may be compulsorily set to "1"s or "0"s at an arbitrary sample period such as 10 sample period. If the period is 10 samples, the LSBs of the 100 samples are modified in the 1,000 samples. However, by counting the number of "1" s and "0"s of the LSBs of 10 series of different phases at 10-sample periods, the totality of 100 samples are detected as "1" or "0" so long as there is no error, thus assuring high reliability. If "1"s or "0"s are compulsorily inserted into the LSBs, at e.g., 100 sample period, 10 of 1,000 samples are of the same value in the 1,00 samples, so that detection can be achieved with some reliability. However, if the period is longer, the number of sample series for parallel counting is increased, so that it becomes necessary to effect parallel counting in the LSBs of the 100 series of samples having different phases. The number of samples that is handled statistically is not limited to 1,000 but may be optionally set to 2,000 or 10,000 samples.

It is also possible to embed plural sorts of identification signals in parallel. If the total number of samples handled statistically is 1,000, and "1"s or "0"s are compulsorily inserted at a period of 50 samples, plural sorts of identification signals can be inserted at different phases in the 50-sample period. If, as a specified example, five sorts (channels) of the identification signals are embedded in different phases, and these five sorts are embedded at equal intervals, the LSBs are compulsorily set to "1"s or "0"s at a period of 10 samples. For detection, LSBs of the 50 different sample series having different phases are counted at 50 sample periods and a series in which only "1"s or "0"s are contiguously detected may be used as an identification signal. Of course, the number of samples or the number of sample periods are not limited to 1000 samples or 50 samples, respectively.

It may also be conceived to handle the LSBs of the samples at periodic positions in the sample series. That is, of 1,000 16-bit samples of the audio PCM signals, sequentially taken out at, for example, five samples as a period, 200 samples, may be arbitrarily taken out and compulsorily set to "1"s or "0"s. In this case, the 1 bit of the identification information is distributed in a range of contiguous 5,000 samples of the original PCM data. Of the 1,000 samples of the 5-sample periods in the 5,000 samples, 200 samples may be selected by taking 200 consecutive samples, random 200 samples or 200 samples at a 5-sample period (the period being 25 samples for the entire samples).

If "1"s are inserted in the LSBs in the above examples, statistic bias may be enlarged by modifying to "1"s only "0"s of the LSBs of the original data.

In sum, if the LSBs of the audio PCM signal samples are set to, for example, "0", at a pre-set time interval, whether synchronously or asynchronously, the number of "0"s is statistically increased and the number of "1"s is correspondingly decreased, whereas, if the LSBs are set to "1" in the same manner, the number of "1"s is statistically increased and the number of "0"s is correspondingly decreased.

Thus, if the LSBs, for example, of respective audio PCM samples are set to "0"s or "1"s at a pre-set time interval, it becomes possible to insert an identification signal represented by one bit of "0" or "1" in the above-mentioned 1-sample-16-bit audio PCM signals. The above pre-set time interval is preferably set so as not to produce alien hearing feeling even if the "0"s or "1"s are inserted in the LSBs.

Instead of inserting "0"s or "1"s at a pre-set time interval as described above, it is also possible to insert an identification signal made up of noise-like "0"s and "1"s having meaning in a certain time interval in, for example, the LSBs of respective samples in the pre-set time interval. If the LSBs of the respective samples are read with the above time intervals as units, it becomes possible to take out the identification signals from the LSBs in the respective samples in the time interval. If the contents of the identification signal to be inserted into the above LSBs are modified at the above-mentioned time interval, it becomes possible to insert plural sorts of identification signals. It is however desirable to use the noise-like information as the plural sorts of the identification signals in order to minimize adverse psychoacoustic effects.

The identification signal may be inserted into bits other than the LSBs. In the case of audio signals, ill effects on the acoustic sense may be minimized by inserting the identification signal in the LSBs. Therefore, the identification signal is inserted in the present embodiment in the LSBs.

If the identification signal is inserted in the LSBs in low signal level (signal energy) portions of audio signals, there is a risk that addition of an identification signal even in the LSB produces outstanding alien psychoacoustic feeling. For example, if the signal level corresponds to 15 bits in terms of an absolute value level, a range from 0 to 32767 may be represented, of which the MSB corresponds to 16384 and the LSB corresponds to 1. If the LSB is intentionally modified for addition of the identification signal, and if the original signal level is 25000, for example, the effect of intentional change of the LSB is small. However, if the original signal level is 10, for example, the effect of intentionally changing the LSB is no longer negligible. For avoiding such ill effect on the psychoacoustic sense, it is also possible to add the identification signal only to the LSBs in the high signal level (signal energy) portion. In such case, it becomes necessary to detect a high signal level portion and to add the identification signal to the LSBs only in such high signal level portion. This can be achieved by operating on the LSB only when "1" is set in, for example, the MSB.

In the low signal level portion temporally before and after the high signal level portion, the masking effect on the time axis, that is the effect of the low signal level portion being masked by the high signal level portion, is in operation, so that addition of the identification signal can be done only in the masked portion. Similarly, if time-domain audio signals are orthogonal-transformed into frequency-domain signals (frequency components) which are quantized, the masking effect on the frequency axis, that is the effect in which low-energy frequency components are masked by frequency components where the energy is strongly concentrated, is in operation. In such case, the identification signal may be appended only to this masked low-energy frequency components.

Although the above refers to audio signals, the same holds true for video signals. Since the LSB of an 8-bit luminance signal assumes statistically random values, it becomes possible to increase or decrease "0"s or "1"s in the LSBs of the luminance signal. In the case of video signals, insertion of "0"s or "1"s in the LSBs of the luminance signals may be on the pixel PX basis, line basis, field or frame basis, on multiple frame basis or on the time basis, such as at an interval of one second. If the signal insertion is on the multi-frame basis, the identification signal may be appended in certain pixel data of every 30th frame. In the case of the video signals, such an interval is preferably used in which as small effects on the visual sense as possible will be produced by insertion of "0"s and "1"s in the LSBs.

In the case of the video signals, the identification signal may be inserted in bits other than the LSB. It is however desirable to insert the identification signal in the LSBs since any adverse effects on the visual sense may be minimized in the case of the video signals if the identification signal is inserted in the LSBs.

In the case of video signals, as in audio signals, it is possible to insert the identification signals, made up of noise-like "0"s and "1"s, having a meaning at a certain time width, in the LSBs as described above. Also, in the case of the video signals, plural sorts of the identification signals may be inserted by varying the contents of the identification signals inserted in, for example, the LSBs at a pre-set time interval. In inserting the plural sorts of the identification signals, the noise-like information which possibly affects visual characteristics to a lesser extent is preferably employed.

In the case of the video signals, if the identification signals are added to a low signal level portion, the added signal tends to become visually outstanding. Therefore, the above identification signal may be added only in the high signal level portion, as described above. The identification signal may be appended taking the masking effect as visual characteristics into account.

According to the present invention, as described above, the number of "0"s or "1"s may be statistically increased or decreased in the LSBs of time-domain audio PCM signals or video signals exhibiting strong time-axis or frequency axis correlation by adding "0"s or "1"s in these LSBs for supplementarily appending the identification signal other than the audio or video information.

If the identification signal is the information specifying that the audio or video signals represent original audio or video signals, it becomes possible to identify the audio or video signals to be original signals or copied signals, or to record copying hysteresis.

The identification signal may also be a maker ID, producer ID, formatter ID, copying management information, such as copy inhibit/permit, or the key information for encryption, instead of being the above-mentioned information specifying whether the signal is an original signal or a copied signal.

Meanwhile, the identification signal, annexed to the audio or video signals, may also be such a signal as compulsorily sets a given domain to "0"s or "1"s, instead of being a statistically represented signal, as described previously. That is, the identification signal compulsorily setting a given domain to "0"s or "1"s, may also be a certain sort of the control signal, or may be used for prescribing and detecting an area containing these "0"s or "1"s.

An illustrative structure for realization of the above will now be explained. First, an illustrative structure of appending the identification signal to the video signals is explained.

Figure 4:
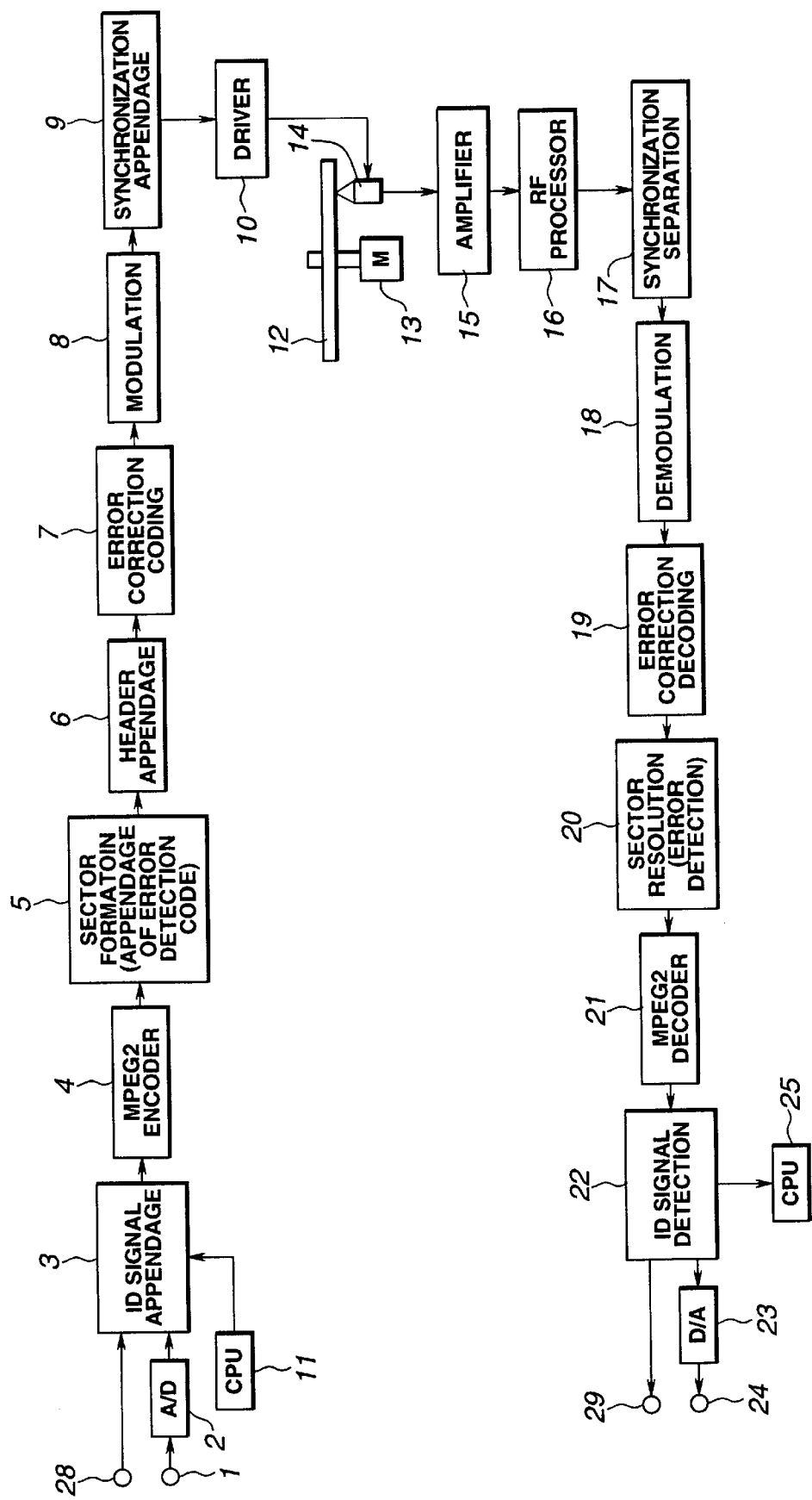
FIG. 4 is a block circuit diagram showing an arrangement of an illustrative signal recording apparatus and an illustrative signal reproducing apparatus.

FIG. 4 shows an illustrative arrangement of a signal recording apparatus for recording video signals, to which the above identification signal has been appended, on an optical disc 12, as a signal record medium (recording, recordable or recorded) of the present invention, and an illustrative arrangement of a signal reproducing apparatus for reproducing video signals, having the appended identification signal, from the optical disc 12.

To a terminal 1 of the signal recording apparatus is fed an analog video signal, which is then converted by an analog-to-digital converter 2 into digital video signals and thence supplied to an identification signal appendage circuit 3. To a terminal 28 can be sent a digital video signal. When the digital video signal is supplied to the terminal 28, it is sent to the identification signal appendage circuit 3.

The identification signal appendage circuit 3 appends the above-mentioned identification signal to the LSB of the eight bits of the luminance signals, as previously explained, under control by the CPU 11.

The digital video signal, to which the identification signal has now been appended, is sent to an encoding circuit 4. The encoding circuit 4 encodes the digital video signal in accordance with the MPEG2 standard proposed by the MPEG (Moving Picture Image Coding Experts Group). The resulting encoded signal is sent to a sector forming circuit 5.

The sector forming circuit 5 forms the encoded video signals into sectors in terms of a pre-set data quantity, such as 2048 bytes, as a unit, and appends error correction codes to the sectors. An output of the sector forming circuit 5 is sent to a header appendage circuit 6 where header data arrayed at the leading end of each sector is appended. The resulting data is sent to an error correction coding circuit 7, which then executes data delay and parity calculations and appends parity bits to the data.

An output of the error correction encoding circuit 7 is sent to a modulation circuit 8 which then converts the 8-bit data into, for example, 16-channel bit modulated data, which is sent to a synchronization appendage circuit 9. The latter appends synchronization signals of a so-called out-of-rule pattern, violating the modulation rule of the above-mentioned pre-set modulation system, in terms of a pre-set data volume as a unit, and sends the resulting data to a recording/reproducing head 14, via a driving circuit, that is a driver 10.

The recording/reproducing head 14 performs recording and reproduction optically, photomagnetically or by phase change, and records the above signals on an optical head run in rotation by a rotation servo controlled spindle motor 13. The recording in this case includes not only direct recording on the disc record medium, but also cutting for disc production. For this cutting, pits are formed on a master disc, that is an original disc, a metal master or a stamper is formed by plating or the like, and an optical disc is then mass-produced using this stamper.

Figure 5:
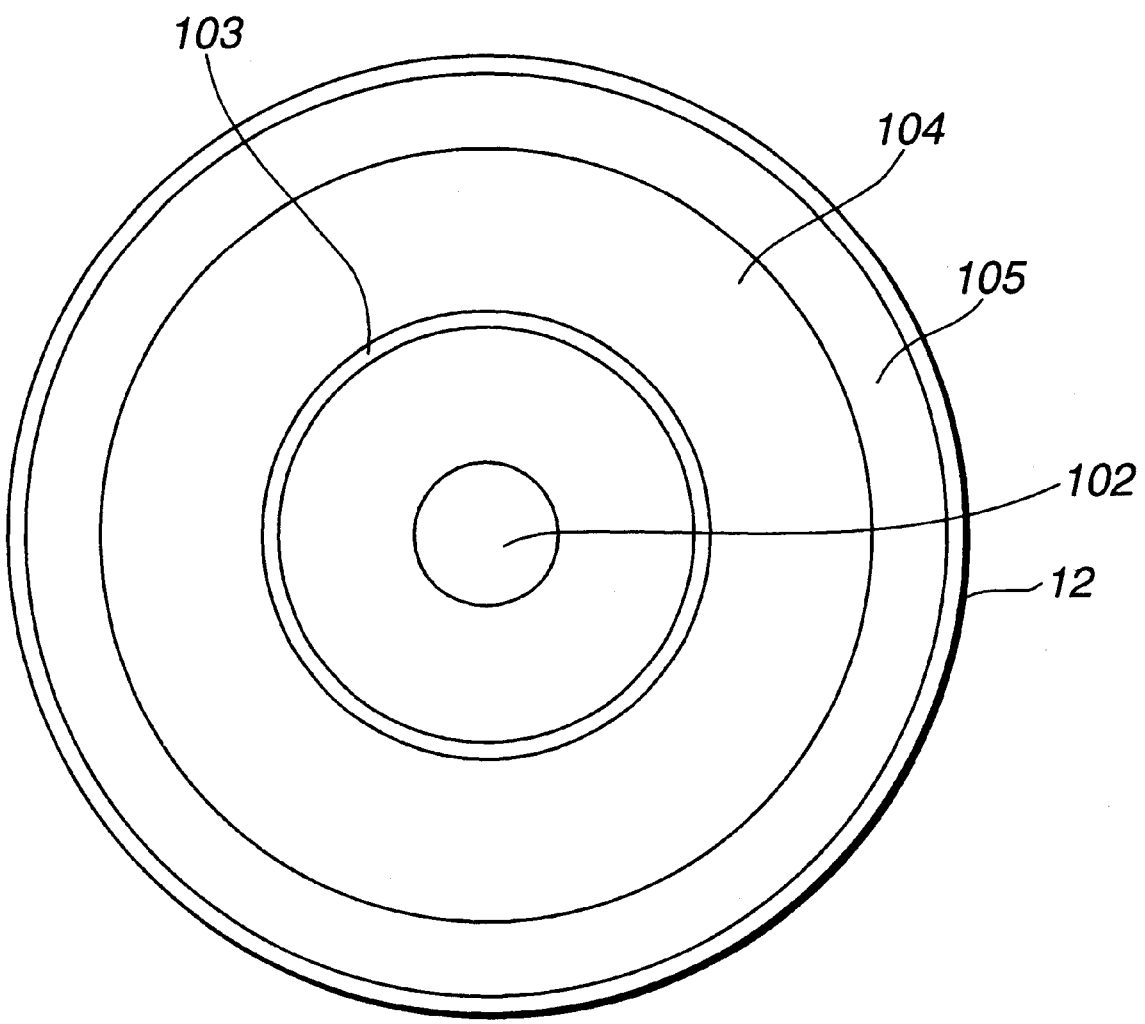
FIG. 5 shows an optical disc as an example of a signal record medium.

The optical disc 12 has a center aperture 102, and has, looking from the inner rim towards the outer rim thereof, a lead-in area 103 as a program management area or table-of-contents (TOC) area, a program area 104, in which to record program data, and a program end area, that is a so-called lead-out area 105, as shown in FIG. 5.

With a signal reproducing apparatus for reproducing signals from the optical disc 12, the optical disc 12 is run in rotation by the spindle motor 13, and recording signals are read from the optical disc 12 by the recording/reproducing head 14. The signal read by the recording/reproducing head 14 (RF signals) are amplified by an amplifier 15 and converted into bi-level signals by an RF processor 16.

The digital signal, converted by the RF processor 16 into bi-level signals, is sent to a synchronization separation circuit 17, which then separates the synchronization signal appended by the synchronization appendage circuit 9. The digital signal from the synchronization separation circuit 17 is then sent t o a demodulating circuit 18 for performing a reverse operation of modulation performed by the modulation circuit 8. The digital data from the demodulation circuit 18 is sent to an error correction decoding circuit 19 where the decoding which is the reverse operation of encoding by the encoding circuit 7 is performed.

An output of the error correction decoding circuit 19 is sent to a sector resolution circuit 20 where it is resolved into sectors and simultaneously corrected for errors. The resulting data is sent to an expansion decoding circuit 21.

The expansion decoding circuit 21 decodes (expands) the encoded (compressed) video signals in accordance with the MPEG2 rule. The decoded (expanded) signals are sent to an identification signal detection circuit 22.

The identification signal detection circuit 22 operates in association with identification signal addition by the identification signal addition circuit 3 of the signal recording apparatus, that is, checks the information of the LSB of the eight bits of the luminance signal, in order to detect the identification signal appended to the LSB. The detected identification signal is sent to the CPU 25, which then recognizes the contents of the identification signal.

The digital video signal outputted by the identification signal detection circuit 22 is sent to a digital/analog (D/A) converter 23 where it is converted into analog video signals which are outputted at an output terminal 24. The digital video signal outputted by the identification signal detection circuit 22 can be directly outputted to outside via a terminal 29 without being sent to the D/A converter 23.

Figure 6:
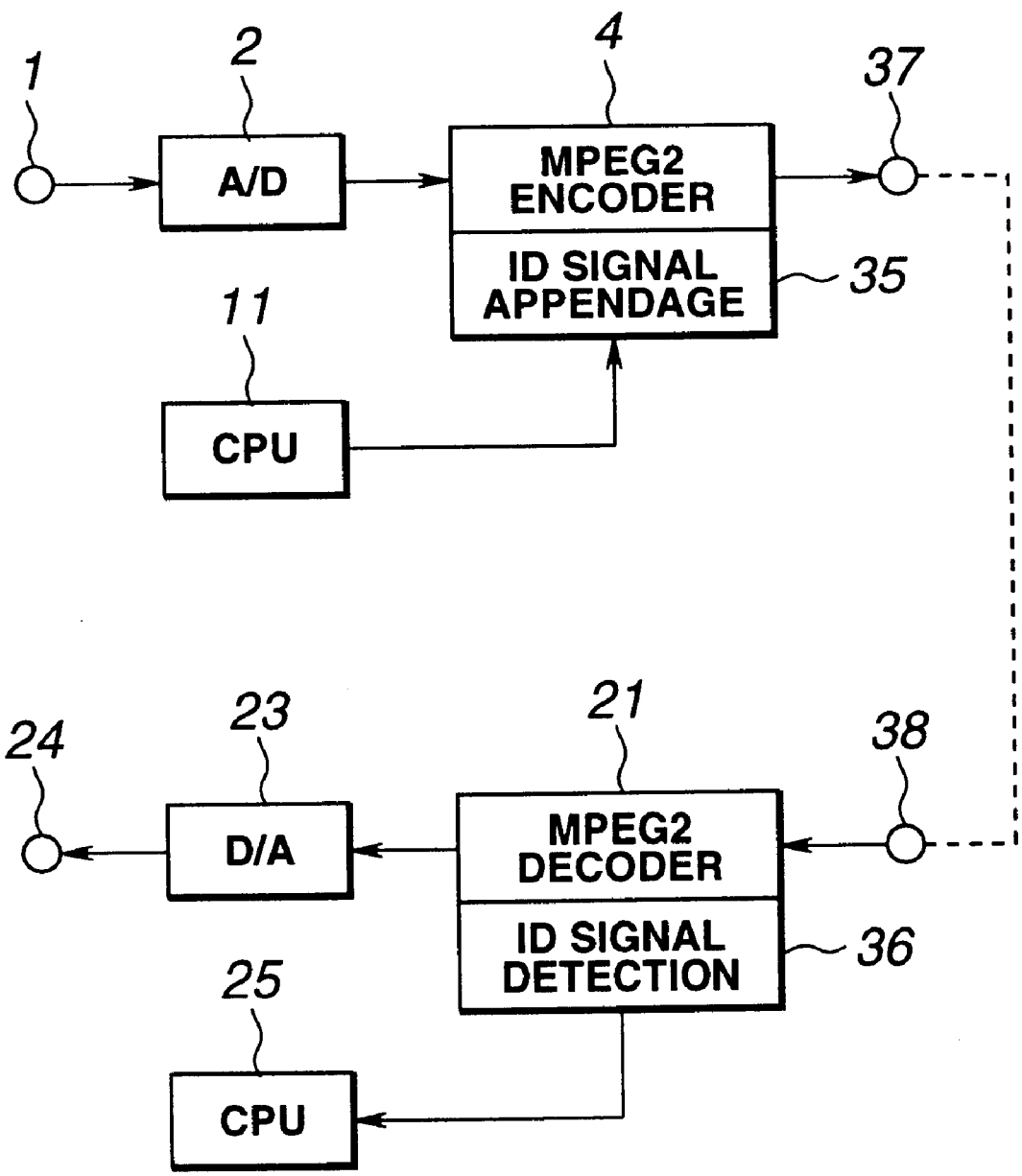
FIG. 6 is a block circuit diagram showing an example of appending an identification signal during encoding for data compression.

Although the structure of appending an identification signal to the digital video signals upstream of the encoding circuit 4 is shown in the embodiment of FIG. 4, the identification signal can also be appended at the time of encoding by the encoding circuit 4, as shown in FIG. 6.

Referring to FIG. 6, digital video signals outputted by the A/D converter 2, or digital video signals directly supplied from a terminal 28 of FIG. 4, are directly supplied to the encoding circuit 4, to which is annexed an identification signal detection circuit 36. The encoding circuit 4 effects encoding in accordance with the MPEG2 as described above. The identification signal appendage circuit 36 appends the identification signal to the encoded digital video signals under control by the CPU 11 as will be explained subsequently. The digital video signals, to which has been appended the identification signal, are sent via a terminal 37 to a downstream circuit, that is the sector-forming circuit 5 shown in FIG. 4.

The signal read out from the optical disc 12 and outputted from the sector resolution circuit 20 of FIG. 4 is sent via a terminal 38 to the decoding circuit 21. The decoding circuit 21 has annexed thereto the identification signal detection circuit 36. The identification signal detection circuit 36 detects the identification signal appended to the encoded signal and sends the detected identification signal to the CPU 2. The decoding circuit 21 performs decoding as described above. An output of the decoding circuit 21 is directly outputted at a terminal 29 of FIG. 4 or sent to a D/A converter 23 for conversion into analog signals.

Figure 7:
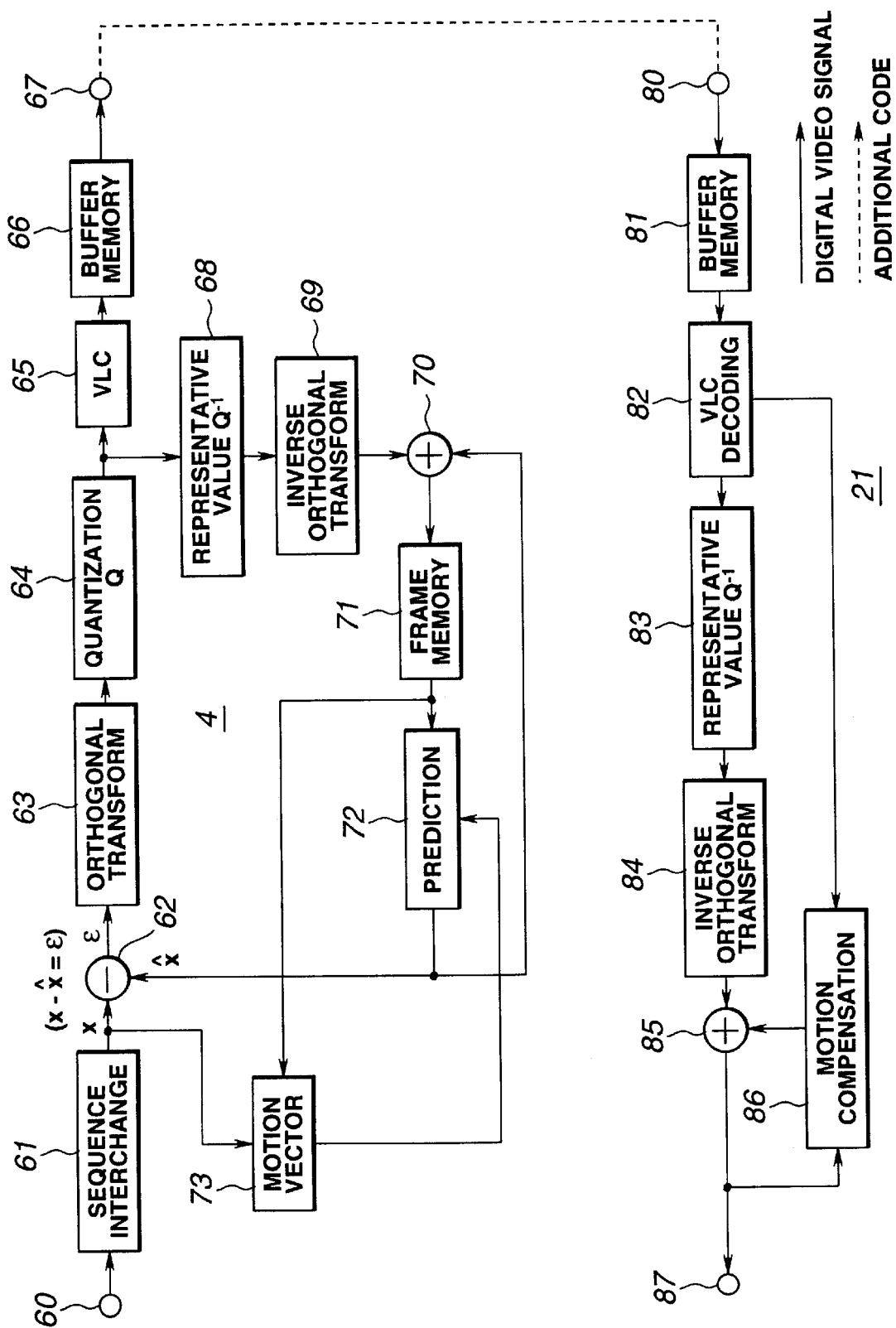
FIG. 7 is a block circuit diagram showing an illustrative arrangement of an encoding circuit for compression.

The encoding circuit 4 is configured as shown for example in FIG. 7.

Figure 8B:
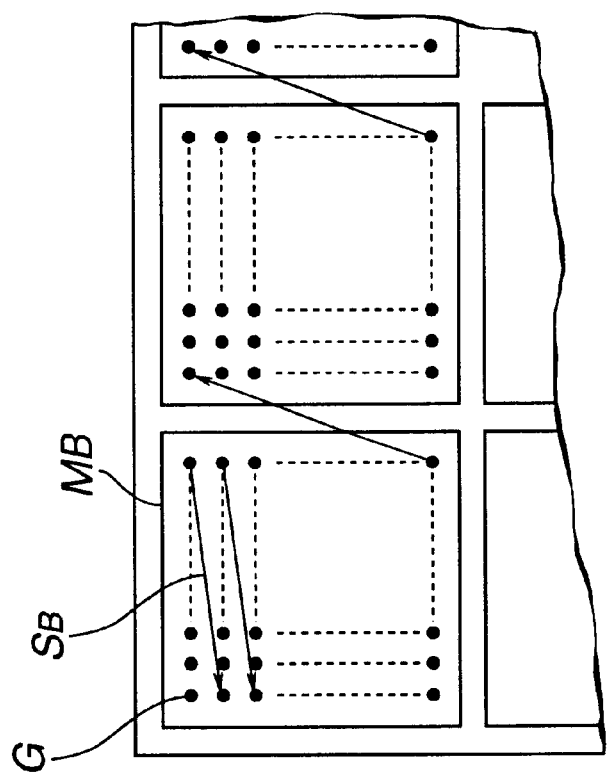
FIG. 8 illustrates a sequence interchanging operation.
Figure 8A:
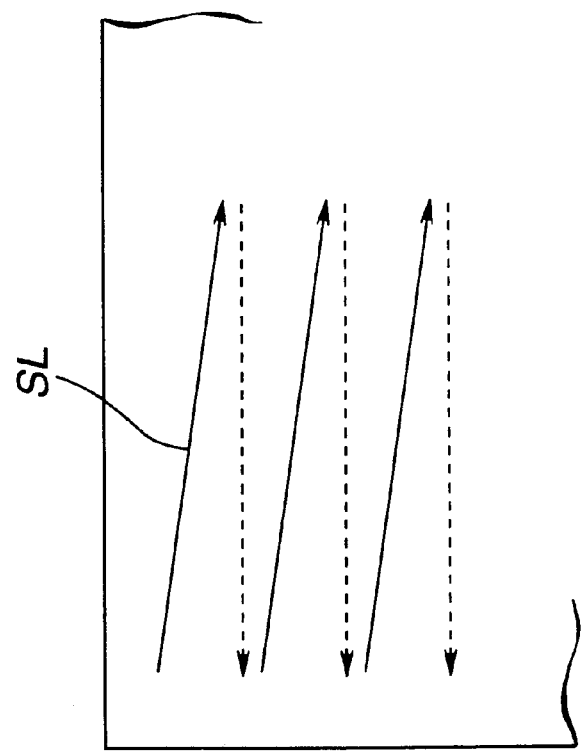

Referring to FIG. 7, the digital video signal from the A/D converter 2 of FIG. 6 or the digital video signal from the terminal 28 of FIG. 4 is supplied to a terminal 60. This digital video signal is supplied to a sequence interchange circuit 61. The sequence interchange circuit 61 designates one of the three picture types, namely an intra-picture (intra-coded picture), a predictive coded picture (P-picture) and a bidirectionally predictive coded picture (B-picture), in terms of which to process the pictures of the respective frames of the digital video signals of the sequentially entered moving pictures, and re-arrays the respective frame pictures in the encoding sequence in accordance with the designated types of the picture encoding. The sequence interchange circuit 61 splits the video signals, re-arrayed on the frame basis and having a raster scan sequence video signals as shown by arrow $S_L$ in FIG. 8a, into plural processing blocks MB, each composed of a plurality of pixels G, as shown in FIG. 8b. The processing block MB is made up of luminance components associated with 16 16 pixels. The luminance components associated with 16 16 pixels are made up of four small blocks each made up of 8 8 dots, and are associated with Cb and Cr components, each made up of 8 8 dots. From the sequence interchange circuit 61, the pixel data in the processing block MB are taken out and outputted in the sequence shown by arrow $S_B$.

An output data from the sequence interchange circuit 61 is sent to a motion vector detection circuit 73 for estimating the motion vector of a currently encoded frame. The motion vector detection circuit 73 is also fed from the sequence interchange circuit 61 with the information specifying the picture encoding type synchronized with each frame, so that data of the respective frames are processed as I-picture, P-picture or B-picture in accordance with the picture encoding type information. That is, the motion vector detection circuit 73 generates the motion vector information using the picture encoding type and the prediction error data from a frame memory 71 as later explained. An output of the motion vector detection circuit 73 is sent to a motion compensation prediction circuit 72.

The motion compensation prediction circuit 72 generates a prediction picture, using the picture encoding type information, motion vector information and prediction error data from the frame memory 71. No prediction picture is generated for the I-picture. The prediction picture data is sent to a subtractor 62 and to an adder 70.

The subtractor 62 subtracts data of the prediction picture form data outputted by the sequence interchange circuit 61 to produce difference data which is outputted as prediction error data. If the data of a frame to be processed as an I-picture is supplied from the sequence interchange circuit 61, no subtraction is carried out, such that data of the frame is directly outputted.

An output data of the subtractor 62 is sent to an orthogonal transform circuit 63 executing a discrete cosine transform (DCT). The DCT coefficients resulting from DCT processing are sent to a quantization circuit 64.

The quantization circuit 64 performs non-linear quantization on the DCT coefficients with a quantization scale (quantization step) associated with the prediction error data and outputs the resulting quantized data. That is, the quantization circuit 64 performs non-linear quantization using a finer quantization step and a coarser quantization step if the prediction error data is close to zero or if the absolute value of the prediction error data is larger, respectively. The quantization circuit 64 also quantizes the DCT coefficients with the quantization scale (quantization step) associated with the data storage quantity in a buffer memory 66 of a succeeding stage.

The quantized data outputted by the quantization circuit 64 is sent to a variable length encoding circuit (VLC) 65. This variable length encoding circuit 65 converts quantization data from the quantization circuit 64 into, for example, a variable length code, such as a Huffman code, in association with the quantization scale information supplied from the quantization circuit 64, and outputs the resulting code to the buffer memory 66. The variable length coding circuit 65 also variable length encodes the information specifying the picture encoding type, the information specifying the quantization scale, the prediction mode information from the motion vector detection circuit 72 and the motion vector information.

The buffer memory 66 transiently stores data supplied from the variable length encoding circuit 65. The data thus stored is subsequently read out at a pre-set timing so as to be outputted at an output terminal 67. Output data from the output terminal 67 is sent via terminal 37 of FIG. 6 to the sector forming circuit 5 of FIG. 4. The buffer memory 66 feeds back the quantization control signal associated with the data storage quantity to the quantization circuit 64. That is, if the residual stored data quantity is increased to an allowable upper limit value, the buffer memory 66 causes the quantization scale of the quantization circuit 64 to be enlarged by the quantization control signal for lowering the data quantity of the quantized data. On the other hand, if the residual stored data quantity is decreased to an allowable lower limit value, the buffer memory 66 causes the quantization scale of the quantization circuit 64 to be diminished by the quantization control signal for increasing the data quantity of the quantized data. This prevents overflow or underflow of the buffer memory 66.

On the other hand, output data of the quantization circuit 64 is supplied to a dequantization circuit 68 where dequantization occurs using the quantization scale information supplied from the quantization circuit 64. Output data of the dequantization circuit 68 is sent to an inverse orthogonal transform circuit 69 where it is inverse DCTed and stored via an adder 70 in a frame memory 71.

The data read out from the frame memory 71 is sent to a motion compensation prediction circuit 72, where a prediction picture is generated using the data read out from the frame memory 71, the picture encoding type information and the motion vector information, as explained previously.

The data outputted by the sector resolution circuit 20 and sent via terminal 38 of FIG. 6 is sent to a terminal 80 of the decoding circuit 21 of FIG. 21. This data is transiently stored in a buffer memory 81 and subsequently read out from the buffer memory 81 so as to be sent to a variable length decoding (VLD) circuit 82.

The variable length decoding (VLD) circuit 82 decodes the data supplied from the buffer memory 81 by a decoding operation corresponding to the variable length encoding at the time of encoding the moving picture. The information on the quantized data and the quantization scale (quantization step) resulting from the decoding by the variable length decoding circuit 82 is supplied to a dequantization circuit 83. The variable length decoding circuit 82 also decodes the information specifying the picture encoding type, motion compensation mode information and the motion vector information and sends the resulting information to a motion compensation circuit 86.

The dequantization circuit 83 dequantizes the quantization data supplied from the variable length decoding circuit 82 in accordance with the quantization scale information supplied from the variable length decoding circuit 82 and sends the dequantized data to an inverse orthogonal transform circuit 84.

The inverse orthogonal transform circuit 84 performs inverse DCT (IDCT) on data supplied from the inverse quantization circuit 83. Output data of the inverse orthogonal transform circuit 84 is sent to an adder 85.

The motion compensation circuit 86 has a frame memory in which picture data resulting from previous decoding is stored. The motion compensation circuit 86 generates reference picture data from the decoded picture data stored in the frame memory, based on the motion compensation mode information and the motion vector information, and outputs the reference picture data to the adder 85. The adder 85 adds the output data of the inverse orthogonal transform circuit 84 (difference data in case of P and B pictures) to the reference picture data. If the picture being processed is an I-picture, no reference picture data is generated in the motion compensation circuit 86, so that the reference data is not added to the picture data by the adder 85.

The identification signal addition circuit 35 of FIG. 6 sends an identification signal to the above-described encoding circuit 4 configured as shown in FIG. 7. The encoding circuit 4 appends an identification signal to data resulting from processing by the orthogonal transform circuit 63, quantization circuit 64 or the variable length encoding circuit 65 in a manner of minimizing adverse effects on the data. The identification signal detection circuit 36 detects the identification signal appended to the data resulting from processing by the orthogonal transform circuit 63, quantization circuit 64 or the variable length encoding circuit 65.

The structure of FIG. 6, having the orthogonal transform circuit 63 and the inverse orthogonal transform circuit 84, adds the identification signal as follows:

Suppose that there are n pixels in the vertical direction and m pixels in the horizontal direction. In DCT, usually n=8 and m =8. If determinants [Y], [X], [Dn] and [Dm] shown in Equations 1 to 4 are used, data made up of n pixels in the vertical direction and m pixels in the horizontal direction, as indicated by a determinant [X], are converted by DCT as orthogonal transform into coefficient data represented by the determinant [Y] by transformation matrices [Dn] and [Dm] as shown by an Equation (5):

$$[Y] = \begin{bmatrix} y_{0,0} & y_{0,1} & \cdots & y_{0,m-1} \\ \vdots & & & \vdots \\ y_{n-1,0} & \cdots & \cdots & y_{n-1,m-1} \end{bmatrix} \quad (1)$$

$$[X] = \begin{bmatrix} x_{0,0} & x_{0,1} & \cdots & x_{0,m-1} \\ \vdots & & & \vdots \\ x_{n-1,0} & \cdots & \cdots & x_{n-1,m-1} \end{bmatrix} \quad (2)$$

$$[D_n] = \begin{bmatrix} d_{0,0} & d_{0,1} & \cdots & d_{0,n-1} \\ \vdots & & & \vdots \\ d_{n-1,0} & \cdots & \cdots & d_{n-1,n-1} \end{bmatrix} \quad (3)$$

$$[D_m] = \begin{bmatrix} d_{0,0} & d_{0,1} & \cdots & d_{0,m-1} \\ \vdots & & & \vdots \\ d_{m-1,0} & \cdots & \cdots & d_{m-1,m-1} \end{bmatrix} \quad (4)$$

$$[Y]=[Dn][X][Dm]^T \quad (5)$$

On the other hand, the transform shown by the equation (6):

$$[X]=[Dn]^T[X][Dm] \quad (6)$$

is executed in an inverse orthogonal transform associated with the orthogonal transform.

As characteristic of DCT, the inverse matrix is equal to the transposed matrix, as indicated by the equations (7) and (8):

$$[Dn]^{-1}=[Dn]^T \quad (7)$$

$$[Dm]^{-1}=[Dm]^T \quad (8)$$

In the above-mentioned orthogonal transform and inverse orthogonal transform for DCT with n pixels in the vertical direction and m pixels in the horizontal direction, it is the 64th DCT coefficient, that is the coefficient of the eighth row eighth column, that remains affected to the least extent by addition of the identification signal. the identification signal.

Therefore, if the identification signal is added to the DCT coefficient obtained by the processing by the orthogonal transform circuit 63 of FIG. 7, the identification signal addition circuit 35 adds the identification signal to data of the 64th of the DCT coefficients. On the other hand, if the identification signal is added to the quantized data obtained by the processing by the quantization circuit 64, the identification signal addition circuit 35 adds the identification signal to the quantized data corresponding to the 64th DCT coefficient. Similarly, if the identification signal is added to the quantized data obtained by the processing by the variable length encoding circuit 65, the identification signal addition circuit 35 adds the identification signal to the quantized data corresponding to the 64th DCT coefficient. If such addition of the identification signal is done, the identification signal detection circuit 36 detects an identification signal added to one of the DCT coefficient data, quantized data and encoded data.

Of course, the identification signal can be added not only in an upstream area of the encoding circuit 4 or in the course of encoding, but also in a downstream area of the encoding circuit 4. In addition, signal recording includes not only direct recording on a record medium but also mass producing recorded media by cutting a master disc for mass production or with the aid of cut master discs.

Figure 9:
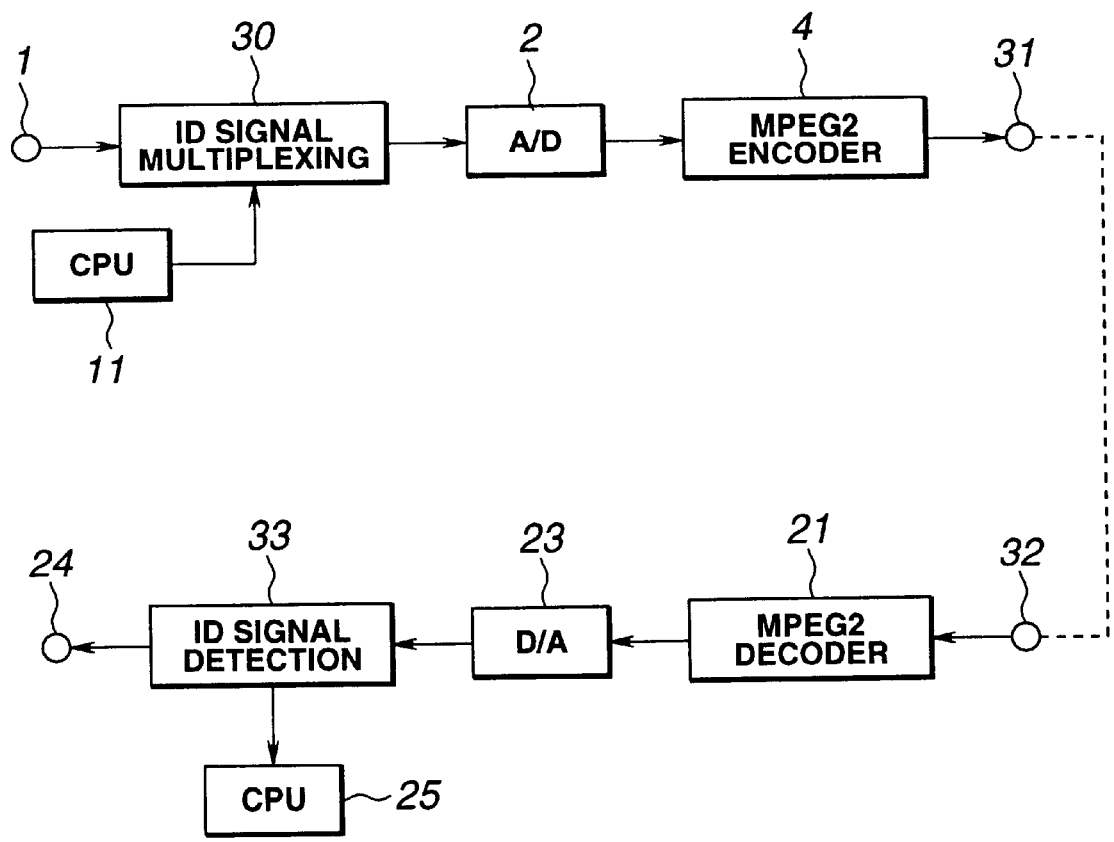
FIG. 9 is a block circuit diagram showing an arrangement of appending an identification signal to a video signal in an analog stage.

Although the identification signal is added in the above examples to the digital video signal, it is also possible to add or multiplex an identification signal to video signals in the analog stage, as shown in FIG. 9.

Referring to FIG. 9, an analog video signal supplied to the terminal 1 is sent to an identification multiplexing circuit 30. The identification multiplexing circuit 30 multiplexes the identification signal on the analog video signal under control by the CPU 11.

For multiplexing the identification signal on the analog video signal, such a method may be employed in which a signal coded in plural bits is mixed by frequency multiplexing in a pre-set horizontal period of the analog video signal. Meanwhile, the identification signal coded with plural bits is comprised of, for example, 14 bits of data and 6 bits of error detection codes (CRCC), and may be inserted in 22nd horizontal period for an odd fields and in the 285th horizontal period for an even field.

The analog video signal, whose identification signal has been multiplexed by the identification signal multiplexing circuit 30, is converted by the A/D converter 2 into digital video signals which are then sent to the encoding circuit 4. The signals encoded by the encoding circuit 4 are sent via a terminal 31 to a downstream side circuit, that is to the sector forming circuit 5 shown in FIG. 4.

The signal read out from the optical disc and outputted from the sector resolution circuit 20 of FIG. 4 is sent va terminal 32 of FIG. 9 to a decoding circuit 21. The signal decoded by the decoding circuit 21 is converted into analog video signals by the D/A converter 23 so as to be supplied to the identification signal detection circuit 33.

The identification signal detection circuit 33 detects the identification signal multiplexed on the analog video signal and sends the detected identification signal to the CPU 25. The analog video signals from the identification signal detection circuit 36 is outputted via output terminal 24 to outside.

Figure 10:
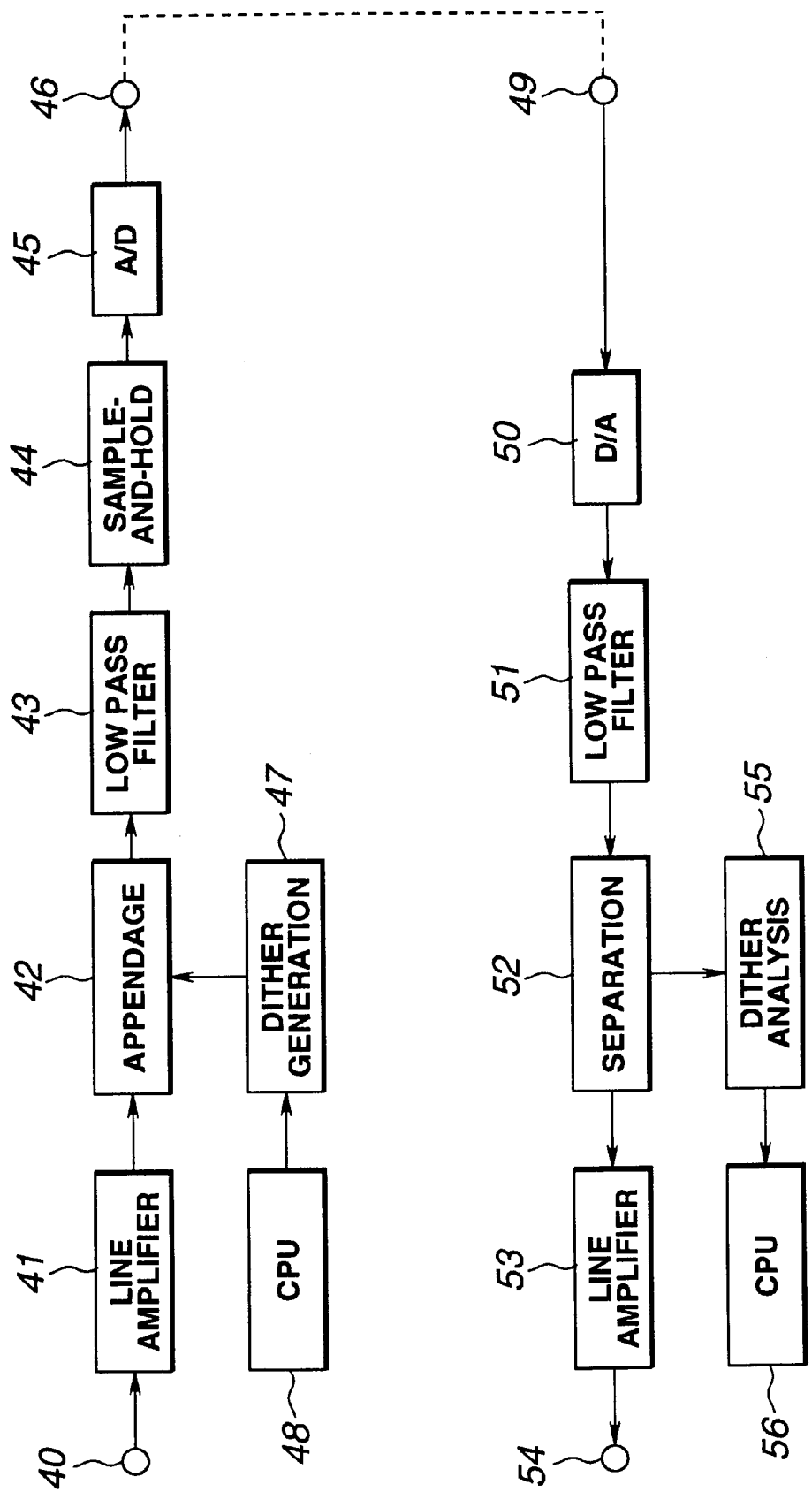
FIG. 10 is a block circuit diagram showing an arrangement of appending an identification signal to an audio signal in an analog stage.

For adding the identification signal to an analog audio signal, a structure shown in FIG. 10 may be employed.

Referring to FIG. 10, analog audio signals supplied via terminal 40 is amplified by a line amplifier 41 and thence supplied to the identification signal addition circuit 42. The identification signal addition circuit 42 adds the identification signal to the analog audio signal under control by the CPU 48.

The identification signal added to the analog audio signals may be a so-called dither noise to which the meaning as an identification signal has been accorded. The dither noise is the high-frequency quantization noise generated in the downstream side quantization and previously superimposed on the analog audio signal for psychoacoustic noise reduction. This dither noise is modulated by FM or AM so as to be given the meaning of the identification signal and the resulting identification signal is added to the analog audio signal.

The dither noise, given the meaning of the identification signal, is generated by the dither generating circuit 47 under control by the CPU 48, and is added to the analog video signal by the identification signal addition circuit 42.

An output of the identification signal addition circuit 42 is sent via the low-pass filter 43 and the sample-and-hold circuit 44 to the A/D converter 45 where it is converted into a digital audio signal. The digital audio signal is sent via terminal 46 to a downstream side optical disc recording system. Since the recording system is substantially similar to the recording system shown in FIG. 4, it is not explained for clarity.

The audio signal recorded on the optical disc is reproduced by the reproducing system and sent via a terminal 49 to a D/A converter 50. The reproducing system also is similar to the reproducing system shown in FIG. 4 and hence is not explained in detail. The analog audio signal from the D/A converter 50 is sent via a low-pass filter 51 to an identification signal separation circuit 52.

The identification signal separation circuit 52 separates the dither noise, given the meaning as the identification signal, from the analog audio signal, and sends the separated signal to a dither analysis circuit 55. The dither analysis circuit 55 analyzes the dither noise and extracts the identification signal to send the extracted identification signal to a CPU 56, which then judges the contents of the identification signal.

The analog audio signal from the separation circuit is amplified by a line amplifier 53 so as to be outputted to outside via a terminal 54.

By previously modulating the dither noise added to the analog audio signal in accordance with the identification signal, the identification signal can be inserted into the audio signal itself while the effect on the analog audio signal is minimized. The signal to which is added the identification signal is not limited to the analog audio signal but may also be an analog video signal. In addition, the signal to which is added the dither signal is not limited to the analog signal. Thus the dither signal added to the multi-bit digital signal prior to re-quantization may be modulated in accordance with the identification signal.

In the above-described structure of the present invention, encoding in accordance with the MPEG2 standard is explained as an example. However, the present invention may also be applied to encoding in accordance with the MPEG1 standard or encoding by generic subband coding, predictive coding, orthogonal transform coding or encoding by vector quantization. In the field of audio signals, the present invention may similarly be applied to encoding known as adaptive transform acoustic coding (ATRAC) which takes human psychoacoustic characteristics into account.

The video signals may be still pictures, graphics pictures or letters, in addition to usual moving picture signals.

As for the signal record medium, an optical disc on which recording can be done by pits, a write-once optical disc, an overwritable magneto-optical disc, a phase-change type optical disc, an organic dye optical disc, an optical disc on which recording can be done with an UV laser beam or an optical disc having a multi-layer recording film, can be employed as an optical disc. In addition, a tape-shaped record medium, such as a video tape, a semi-conductor record medium, such as an IC card or a variety of memory devices, or a magnetic disc record medium, such as a hard disc or a flexible disc, may also be employed.

If the method of appending the identification signal as proposed by the present invention is used, not only the signal can be identified as described above, but also unauthorized signal copying can also be prohibited. That is, it becomes possible to prohibit data recorded on a signal record medium, such as an optical disc, from being copied on a recordable and reproducible record medium, such as a hard disc, while it also becomes possible to prohibit copying from another record medium obtained by directly copying data recorded on the hard disc.

For example, in a duplicating device in which video or audio signals, read out from a signal record medium, are recorded in a plurality of other signal recording media, identification signals are added to video or audio signals to which the above-mentioned identification signals are not added, while the video or audio signals to which the identification signals have been added are prohibited from being copied. In this case, it is possible with the duplicating device to record on a separate disc or the like such signals read out from a regular master disc or master tape having recorded thereon original video signals or audio signals to which no identification signal has been added. On the other hand, it is possible with the duplicating device that signals read out from a disc, having recorded thereon these signals to which the identification signal has already been appended, be recorded on another record medium, provided that the duplicating device detects such identification signal.

As a method for prohibiting unauthorized copying, it has been practiced to record ciphered signals on the signal record medium. However, the signal can be copied freely after deciphering. If, however, the identification signal is added to the signal itself, as in the present invention, unauthorized copying can be prohibited as described above in the duplicating device.

The identification signal can be a copy inhibiting signal, a plant ID, a producer ID, or a key for encryption. Since the identification signal is added as the information of "0" or "1" to the signal itself, it cannot be modified easily, so that it is highly useful for copying prohibition.

If the identification signal is appended on the time basis, if the time is of short duration, such as 1/30 second, the identification signal can be detected easily when the signal is detected later. If the time is of long duration, the identification signal can hardly be detected, meaning that alteration of the identification signal can hardly be achieved. If the identification signal is added at an synchronous timing, the identification signal cannot be detected easily.

In the above-described embodiment, signals are recorded or reproduced on or from a signal record medium. It is however possible to add the identification signal to the transmission/reception signal as described above at the time of signal transmission and reception using a signal transmission medium such as a telephone network, light cable or electrical waves for radio communication not only for ground communication but also for satellite communication. The favorable effect of the present invention may also be achieved when the identification signal is added to the transmission/reception signal.

Figure 11:
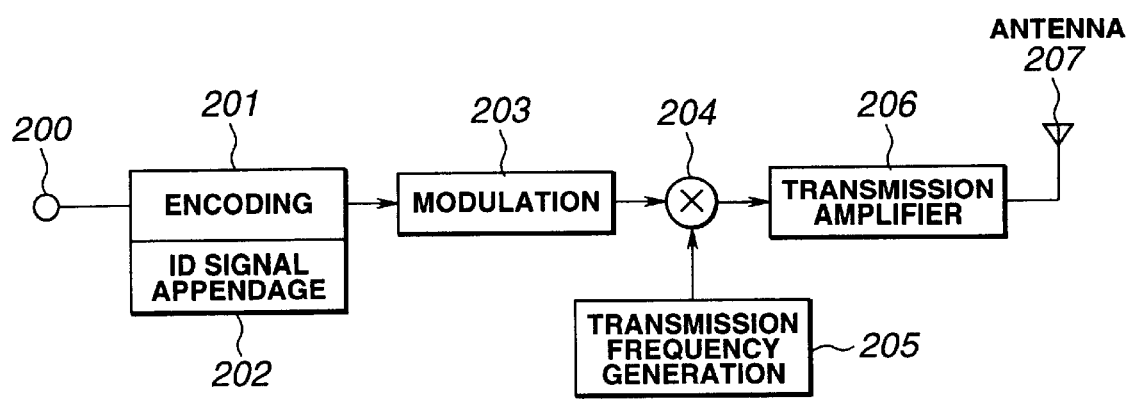
FIG. 11 is a schematic block circuit diagram showing an arrangement of a transmission apparatus.
Figure 12:
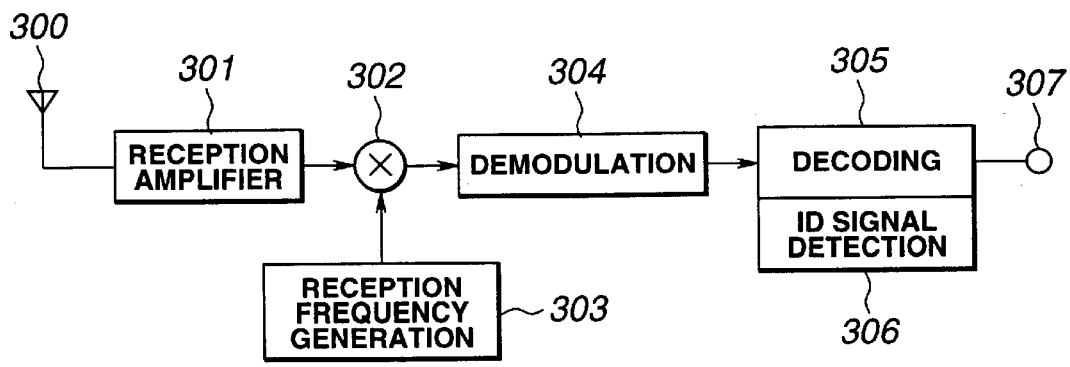
FIG. 12 is a schematic block circuit diagram showing an arrangement of a reception apparatus.

As an illustrative structure of signal transmission and reception, signal transmission and reception may be configured as shown for example in FIGS. 11 and 12 showing the structure of a transmission system and the structure of a reception system, respectively.

Referring to FIG. 11, showing a transmission system, digital video signals and digital audio signals are supplied to a terminal 200. The signals supplied to the terminal 200 are sent to an encoding circuit 201 where the signals are encoded as described above in connection with FIG. 4. The encoding circuit 201 has annexed thereto an identification signal addition circuit 202. The identification signal from the identification signal addition circuit 202 is added to the video signal or audio signals as described above. The signal added to with the identification signal is outputted at the encoding circuit 201. The encoded signal from he encoding circuit 201 is sent to a modulation circuit 203 where it is modulated by pre-set digital modulation. The modulated signal is sent to a mixing circuit 204 comprised of, for example, a linear multiplier. The mixing circuit 204 is fed with a transmission carrier frequency signal from a transmission frequency generating circuit 205, so that the transmission carrier frequency signal is modulated by the signal from the modulation circuit 203. The transmission signal of the transmission frequency range, outputted by the mixing circuit 204, is amplified to a pre-set level by a transmission amplifier, and transmitted over an antenna 207.

In the reception system, shown in FIG. 12, the signal received by an antenna 300 is amplified to a pre-set level by a reception amplifier 301. An output signal of the reception amplifier is sent to a mixing circuit 302. The mixing circuit 302 is fed with a reception frequency signal phase-synchronized with the carrier wave from the reception frequency generating circuit 303 so that a modulation signals of the carrier wave, that is reception signals, are taken out by synchronous detection by the mixing circuit 302.

An output signal of the mixing circuit 302 is sent to a demodulation circuit 304 where an operation which is the reverse of the modulation by the modulation circuit 203 of the transmission system is carried out. The signal taken out from demodulation is sent to a decoding circuit 305 where decoding which is the reverse of the encoding by the encoding circuit 201 of the modulation system is carried out. The decoding circuit 305 has annexed thereto an identification signal detection circuit 306 where the identification signal is detected in the same manner as described above. The signal decoded by the decoding circuit 305 is outputted at a terminal 307.

Figure 13:
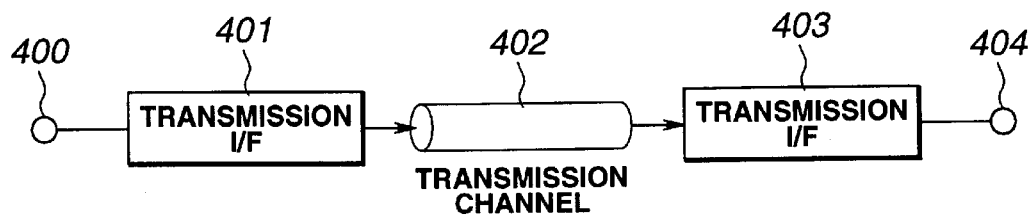
FIG. 13 is a block circuit diagram showing essential portions of signal transmission/ reception over a transmission channel.

FIG. 13 shows an illustrative structure for transmitting/receiving signal over a telephone network or an optical cable. To a terminal 400 of FIG. 13, there is supplied a signal encoded and outputted by the modulation circuit 8 as described above. The signal supplied to the terminal 400 is sent from a transmission interfacing device 401 of the transmission system to a transmission path 402. The signal transmitted on the transmission path 402 is sent via a transmission interfacing device 403 of the reception system to a terminal 404. The signal supplied to the terminal 404 is sent to an arrangement downstream of the demodulating circuit 18 shown in FIG. 4.

It is to be noted that the above-described transmission/reception may be applied not only to an analog system but also to a digital system.

What is claimed is:

1. A signal transmission method comprising:

detecting a high level portion of a video signal and/or audio signal in a predetermined time interval;

modifying a least significant bit of a plurality of portions of said video signal and/or an audio signal within said predetermined time interval to include an identification relative to said video signal and/or said audio signal within a portion of said video signal and/or said audio signal including, or in the vicinity of, a determined high level portion thereof in a configuration so as to reduce the effects of the inclusion of said identification on said video signal and/or said audio signal, wherein said identification is detected only by sampling and detecting all of the least significant bits of all of the video signal and/or audio signal in said predetermined time interval, and processing all of said detected least significant bits; and transmitting said video signal and/or said audio signal including the identification.

2. The signal transmission method as claimed in claim 1 wherein said video signal and/or said audio signal is modified to include said identification in a configuration so that said identification is detected by statistic processing said video signal and/or said audio signal.

3. The signal transmission method as claimed in claim 2 wherein a least significant bit of a portion of said video signal and/or said audio signal is modified to include said identification.

4. A signal transmission apparatus comprising:

means for detecting a high level portion of a video signal and/or audio signal in a predetermined time interval;

means for modifying a least significant bit of a plurality of portions of said video signal and/or an audio signal within said predetermined time interval to include an identification relative to said video signal and/or said audio signal within a portion of said video signal and/or said audio signal including, or in the vicinity of, a determined high level portion thereof in a configuration so as to reduce the effects of the inclusion of said identification on said video signal and/or said audio signal, wherein said identification is detected only by sampling and detecting all of the least significant bits of all of the video signal and/or audio signal in said predetermined time interval, and processing all of said detected least significant bits; and transmission means for transmitting said video signal and/or said audio signal including the identification.

5. The signal transmission apparatus as claimed in claim 4 wherein said video signal and/or said audio signal is modified to include said identification in a configuration so that said identification is detected by statistic processing of said video signal and/or said audio signal.

6. The signal transmission apparatus as claimed in claim 5 wherein a least significant bit of a portion of said video signal and/or said audio signal is modified to include said identification.

7. A signal receiving method comprising:

receiving a signal comprised of a video signal and/or an audio signal having included therein at least an identification relevant to said video signal and/or said audio signal within a portion of said video signal and/or said audio signal including, or in the vicinity of, a determined high level portion thereof within a predetermined time interval, said video signal and/or said audio signal having been modified to include said identification in a configuration so as to reduce the effects of the inclusion of the identification on said video signal and/or said audio signal; and detecting, from the/received signal, the identification included as a portion of said modified video signal and/or said audio signal by sampling and detecting all of the least significant bits of all of the video signal and/or audio signal in said predetermined time interval, and processing said detected least significant bits.

8. The signal receiving method as claimed in claim 7 wherein said video signal and/or said audio signal has been modified to include said identification in a configuration so that said identification is detected by statistic processing of said video signal and/or said audio signal.

9. The signal receiving method as claimed in claim 8 wherein a least significant bit of a portion of said video signal and/or said audio signal is modified to include said identification.

10. A signal receiving apparatus comprising:

means for receiving a signal comprised of a video signal and/or an audio signal having included therein at least an identification relevant to said video signal and/or said audio signal within a portion of said video signal and/or said audio signal including, or in the vicinity of, a determined high level portion thereof within a predetermined time interval, said video signal and/or said audio signal having been modified to include said identification in a configuration so as to reduce the effects of the inclusion of the identification on said video signal and/or said audio signal; and detection means for detecting, from the received signal, the identification included as a portion of said modified video signal and/or said audio signal by sampling and detecting all of the least significant bits of all of the video signal and/or audio signal in said predetermined time interval, and processing said detected least significant bits.

11. The signal receiving apparatus as claimed in claim 10 wherein said video signal and/or said audio signal has been modified to include said identification in a configuration so that said identification is detected by statistic processing of said video signal and/or said audio signal.

12. The signal receiving apparatus as claimed in claim 11 wherein a least significant bit of a portion of said video signal and/or said audio signal is modified to include said identification.

13. The signal transmission method of claim 1, wherein said portion of said video signal and/or said audio signal including, or in the vicinity of, said high level portion is modified by increasing the values of said video signal and/or said audio signal, decreasing the values of said video signal and/or said audio signal, or keeping the values of said video signal and/or said audio signal without change.

14. The signal transmission method of claim 1, wherein said identification is inserted in a least significant bit of a plurality of said video and/or audio signal at predetermined portions of said video and/or audio signal, said identification defining that said video and/or audio signal is original or copied, a maker identification, a formatter identification, or copying management information.

15. The signal transmission apparatus for claim 4, wherein said portion of said video signal and/or said audio signal including, or in the vicinity of, said high level portion is modified by increasing the values of said video signal and/or said audio signal, decreasing the values of said video signal and/or said audio signal, or keeping the values of said video signal and/or said audio signal without change.

16. The signal transmission apparatus of claim 4, wherein said identification is inserted in a least significant bit of a plurality of said video and/or audio signal at predetermined portions of said video and/or audio signal, said identification defining that said video and/or audio signal is original or copied, a maker identification, a formatter identification, or copying management information.

17. The signal receiving method of claim 7, wherein said portion of said video signal and/or said audio signal including, or in the vicinity of, said high level portion has been modified by increasing the values of said video signal and/or said audio signal, decreasing the values of said video signal and/or said audio signal, or keeping the values of said video signal and/or said audio signal without change.

18. The signal receiving method of claim 7, wherein said identification has been inserted in a least significant bit of a plurality of said video and/or audio signal at predetermined portions of said video and/or audio signal, said identification defining that said video and/or audio signal is original or copied, a maker identification, a formatter identification, or copying management information.

19. The signal receiving apparatus of claim 10, wherein said portion of said video signal and/or said audio signal including, or in the vicinity of, said high level portion has been modified by increasing the values of said video signal and/or said audio signal, decreasing the values of said video signal and/or said audio signal, or keeping the values of said video signal and/or said audio signal without change.

20. The signal receiving apparatus of claim 10, wherein said identification has been inserted in a least significant bit of a plurality of said video and/or audio signal at predetermined portions of said video and/or audio signal, said identification defining that said video and/or audio signal is original or copied, a maker identification, a formatter identification, or copying management information.

* * * * *